US012626020B2

(12) United States Patent
Subramanian et al.

(10) Patent No.: US 12,626,020 B2
(45) Date of Patent: May 12, 2026

(54) SYSTEM FOR SECURE INFORMATION TRANSFER IN A VIRTUAL ENVIRONMENT

(71) Applicant: BANK OF AMERICA CORPORATION, Charlotte, NC (US)

(72) Inventors: Sruthi Subramanian, Chennai (IN); Kalyan Chakravarthy Pallapolu, Hyderabad (IN); Gali Mohan Sreenivas, Andhra Pradesh (IN); Gondi Mahesh, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 18/117,812

(22) Filed: Mar. 6, 2023

(65) Prior Publication Data

US 2024/0303376 A1     Sep. 12, 2024

(51) Int. Cl.
G06F 21/62          (2013.01)
G06F 3/01           (2006.01)
(Continued)

(52) U.S. Cl.
CPC ............ *G06F 21/629* (2013.01); *G06F 3/011* (2013.01); *G06F 3/017* (2013.01); *G06T 15/00* (2013.01); *G10L 15/1822* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 7,508,310 B1 | 3/2009 | Light | |
| 8,856,317 B2 | 10/2014 | Robertson | |

(Continued)

FOREIGN PATENT DOCUMENTS

| | | |
|---|---|---|
| KR | 102402170 B1 | 5/2022 |
| WO | 2022131148 A1 | 6/2022 |

(Continued)

OTHER PUBLICATIONS

Qayyum, Adnan et al., "Secure and Trustworthy Artificial Intelligence-Extended Reality (AI-XR) for Metaverses", arXiv:2210.13289v1 [cs.AI], dated Oct. 24, 2022, 24 pages.

(Continued)

*Primary Examiner* — Philip J Chea
*Assistant Examiner* — James Ross Hollister
(74) *Attorney, Agent, or Firm* — Moore & Van Allen PLLC; Nicholas C. Russell

(57)          ABSTRACT

Systems, computer program products, and methods are described herein for secure information transfer in a virtual environment. The present disclosure is configured to receive, using a first user input device, real-time communication from a first user during a virtual interaction session with a second user in the virtual environment; determine that at least a portion of the real-time communication comprises sensitive information; initiate a temporary sub-session within the virtual interaction session in response to determining that the real-time communication comprises sensitive information, thereby temporarily pausing the virtual interaction session; record the sensitive information within the temporary sub-session; terminate the temporary sub-session in response to recording the sensitive information; and resume the virtual interaction session to continue receiving the real-time communication.

16 Claims, 5 Drawing Sheets

(51) Int. Cl.
*G06T 15/00* (2011.01)
*G10L 15/18* (2013.01)
*G10L 15/22* (2006.01)

(56) References Cited

U.S. PATENT DOCUMENTS

| | | | |
|---|---|---|---|
| 8,938,776 B2 | 1/2015 | Meserth | |
| 9,092,627 B2 | 7/2015 | Lee | |
| 10,326,667 B2 | 6/2019 | Jones | |
| 10,657,690 B2 | 5/2020 | Du | |
| 11,475,634 B2 | 10/2022 | Atlas | |
| 11,669,292 B2 * | 6/2023 | Todasco | G06T 19/006 |
| | | | 715/757 |
| 11,909,878 B2 | 2/2024 | Reed | |
| 11,985,141 B2 | 5/2024 | Reich | |
| 2010/0100967 A1 | 4/2010 | Douglas | |
| 2018/0095618 A1 * | 4/2018 | Valdivia | G06F 3/011 |
| 2018/0107835 A1 * | 4/2018 | Clement | A63F 13/212 |
| 2019/0036920 A1 | 1/2019 | Milgramm | |
| 2020/0218585 A1 * | 7/2020 | Dotan-Cohen | G06Q 10/06311 |
| 2022/0343923 A1 | 10/2022 | Todorov | |
| 2023/0237192 A1 * | 7/2023 | Kahan | G01C 21/00 |
| | | | 726/1 |
| 2023/0316263 A1 | 10/2023 | Eby | |
| 2023/0319144 A1 | 10/2023 | Smith | |
| 2023/0376162 A1 | 11/2023 | Galardo | |
| 2024/0070216 A1 * | 2/2024 | Bradley | G06T 19/00 |
| 2024/0070650 A1 | 2/2024 | Cho | |
| 2024/0135437 A1 | 4/2024 | Yang | |
| 2024/0143721 A1 | 5/2024 | Naik | |
| 2025/0024008 A1 * | 1/2025 | Cerra | H04N 13/275 |

FOREIGN PATENT DOCUMENTS

| | | | |
|---|---|---|---|
| WO | 2024071941 A1 | 4/2024 | |
| WO | 2024096244 A1 | 5/2024 | |

OTHER PUBLICATIONS

Xxu, Minrui et al., A Full Dive into Realizing the Edge-enabled Metaverse: Visions, Enabling Technologies, and Challenges, arXiv:2203.05471v2 [cs.NI], dated Aug. 20, 2022, 44 pages.

* cited by examiner

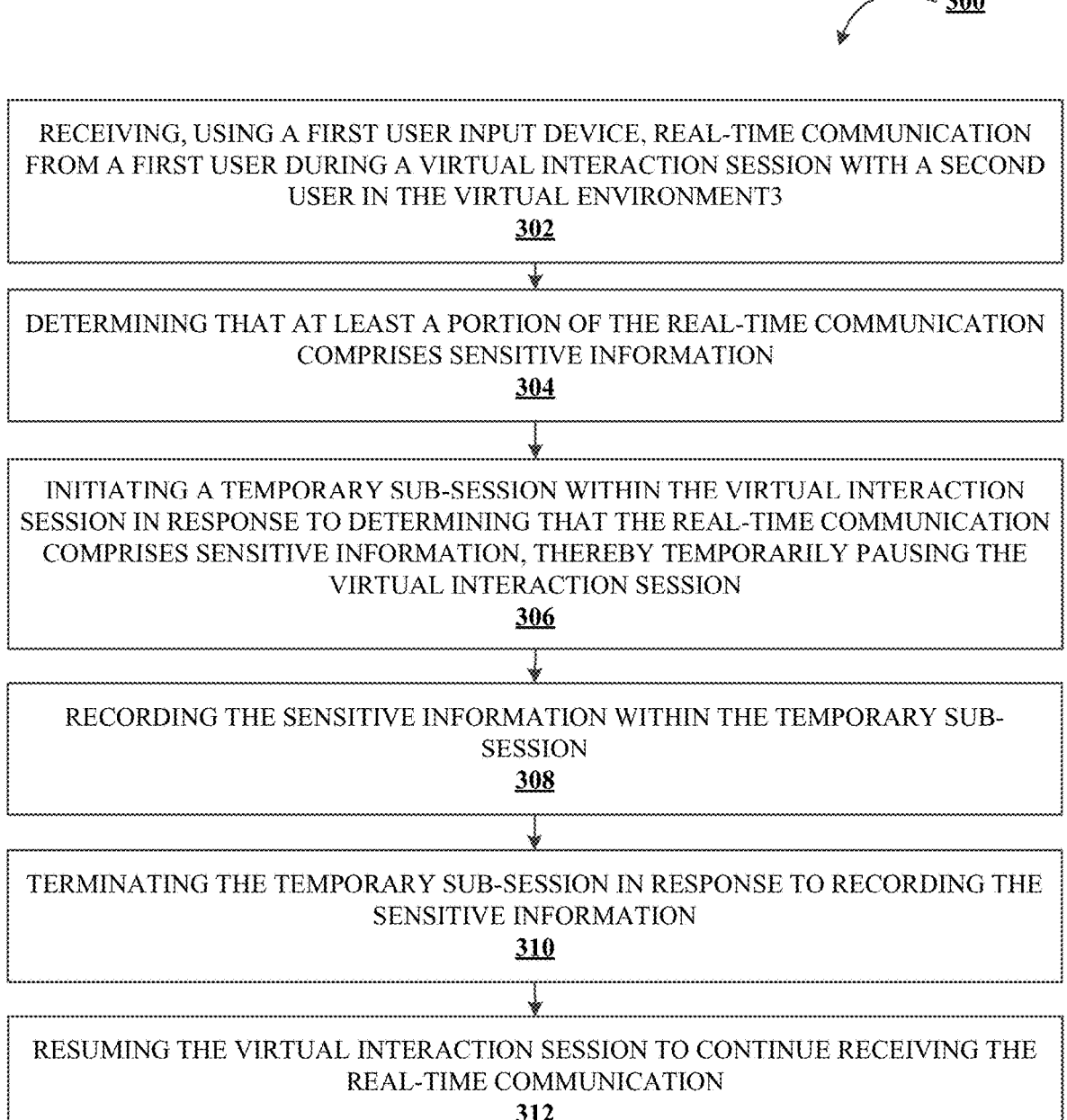

300

RECEIVING, USING A FIRST USER INPUT DEVICE, REAL-TIME COMMUNICATION FROM A FIRST USER DURING A VIRTUAL INTERACTION SESSION WITH A SECOND USER IN THE VIRTUAL ENVIRONMENT3
302

DETERMINING THAT AT LEAST A PORTION OF THE REAL-TIME COMMUNICATION COMPRISES SENSITIVE INFORMATION
304

INITIATING A TEMPORARY SUB-SESSION WITHIN THE VIRTUAL INTERACTION SESSION IN RESPONSE TO DETERMINING THAT THE REAL-TIME COMMUNICATION COMPRISES SENSITIVE INFORMATION, THEREBY TEMPORARILY PAUSING THE VIRTUAL INTERACTION SESSION
306

RECORDING THE SENSITIVE INFORMATION WITHIN THE TEMPORARY SUB-SESSION
308

TERMINATING THE TEMPORARY SUB-SESSION IN RESPONSE TO RECORDING THE SENSITIVE INFORMATION
310

RESUMING THE VIRTUAL INTERACTION SESSION TO CONTINUE RECEIVING THE REAL-TIME COMMUNICATION
312

FIGURE 3

SYSTEM FOR SECURE INFORMATION TRANSFER IN A VIRTUAL ENVIRONMENT

TECHNOLOGICAL FIELD

Example embodiments of the present disclosure relate to secure information transfer in a virtual environment.

BACKGROUND

The use of augmented and/or virtual reality computing environments (collectively referred to herein as "virtual environments") have become increasing more prevalent. By way of example, Metaverse is a hypothetical iteration of the Internet as a single, universal and immersive virtual environment that is facilitated by the use of virtual reality and augmented reality headsets.

Applicant has identified a number of deficiencies and problems associated with secure information transfer in a virtual environment. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for secure information transfer in a virtual environment.

In one aspect, a system for secure information transfer in a virtual environment is presented. The system comprising: a processing device; a non-transitory storage device containing instructions when executed by the processing device, causes the processing device to perform the steps of: receive, using a first user input device, real-time communication from a first user during a virtual interaction session with a second user in the virtual environment; determine that at least a portion of the real-time communication comprises sensitive information; initiate a temporary sub-session within the virtual interaction session in response to determining that the real-time communication comprises sensitive information, thereby temporarily pausing the virtual interaction session; record the sensitive information within the temporary sub-session; terminate the temporary sub-session in response to recording the sensitive information; and resume the virtual interaction session to continue receiving the real-time communication.

In some embodiments, executing the instructions further causes the processing device to: receive, from the first user input device, a request to establish the virtual interaction session with the second user; and establish the virtual interaction session between the first user and the second user in response to receiving the request.

In some embodiments, executing the instructions further causes the processing device to: generate a first notification indicating the request from the first user to establish the virtual interaction session with the second user; transmit the first notification to a second user input device associated with the second user; receive, from the second user input device, a user input from the second user acknowledging the request to establish the virtual interaction session with the first user; and establish the virtual interaction session between the first user and the second user in response to receiving the user input.

In some embodiments, executing the instructions further causes the processing device to: receive, from the second user, a query directed to the first user; and determine that the query is associated with the sensitive information.

In some embodiments, executing the instructions further causes the processing device to: parse, using a natural language processing (NLP) subsystem, the query into one or more components; generate, using the NLP subsystem, a parse tree for the query using the one or more components; and determine that the query is associated with the sensitive information based on at least the parse tree.

In some embodiments, executing the instructions to determine that the query is associated with the sensitive information further causes the processing device to: determine that a response to the query by the first user is likely to comprise the sensitive information.

In some embodiments, the first user is represented by a first virtual object in the virtual environment and the second user is represented by a second virtual object in the virtual environment.

In some embodiments, executing the instructions to initiate the temporary sub-session within the virtual interaction session further causes the processing device to: generate an interactive virtual object to replace the second virtual object in the temporary sub-session, thereby denying the second user access to the temporary sub-session; generate a duplicate instance of the first virtual object representing the first user in the temporary sub-session, thereby allowing the first user to participate in the temporary sub-session; and record the sensitive information exchanged between the duplicate instance of the first virtual object and the interactive virtual object within the temporary sub-session.

In some embodiments, executing the instructions further causes the processing device to: receive, within the temporary sub-session, the sensitive information from the duplicate instance of the first virtual object representing the first user; record the sensitive information within the temporary sub-session, wherein recording further comprises encrypting the sensitive information to generate encrypted sensitive information; and generate a second notification indicating that the sensitive information received from the duplicate instance of the first virtual object representing the first user has been recorded and encrypted; and transmit the second notification to the second user.

In some embodiments, the real-time communication comprises at least speech input and/or gesture-based input.

In some embodiments, executing the instructions to record the sensitive information further causes the processing device to: invoke a cloud-based application programming interface (API); and store the sensitive information in the cloud-based API.

In another aspect, a computer program product for secure information transfer in a virtual environment is presented. The computer program product comprising a non-transitory computer-readable medium comprising code causing an apparatus to: receive, using a first user input device, real-time communication from a first user during a virtual interaction session with a second user in the virtual environment; determine that at least a portion of the real-time communication comprises sensitive information; initiate a temporary sub-session within the virtual interaction session in response to determining that the real-time communication comprises sensitive information, thereby temporarily pausing the virtual interaction session; record the sensitive information within the temporary sub-session; terminate the temporary sub-session in response to recording the sensitive information; and resume the virtual interaction session to continue receiving the real-time communication.

In yet another aspect, a method for secure information transfer in a virtual environment is presented. The method comprising: receiving, using a first user input device, real-time communication from a first user during a virtual interaction session with a second user in the virtual environment; determining that at least a portion of the real-time communication comprises sensitive information; initiating a temporary sub-session within the virtual interaction session in response to determining that the real-time communication comprises sensitive information, thereby temporarily pausing the virtual interaction session; recording the sensitive information within the temporary sub-session; terminating the temporary sub-session in response to recording the sensitive information; and resuming the virtual interaction session to continue receiving the real-time communication.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
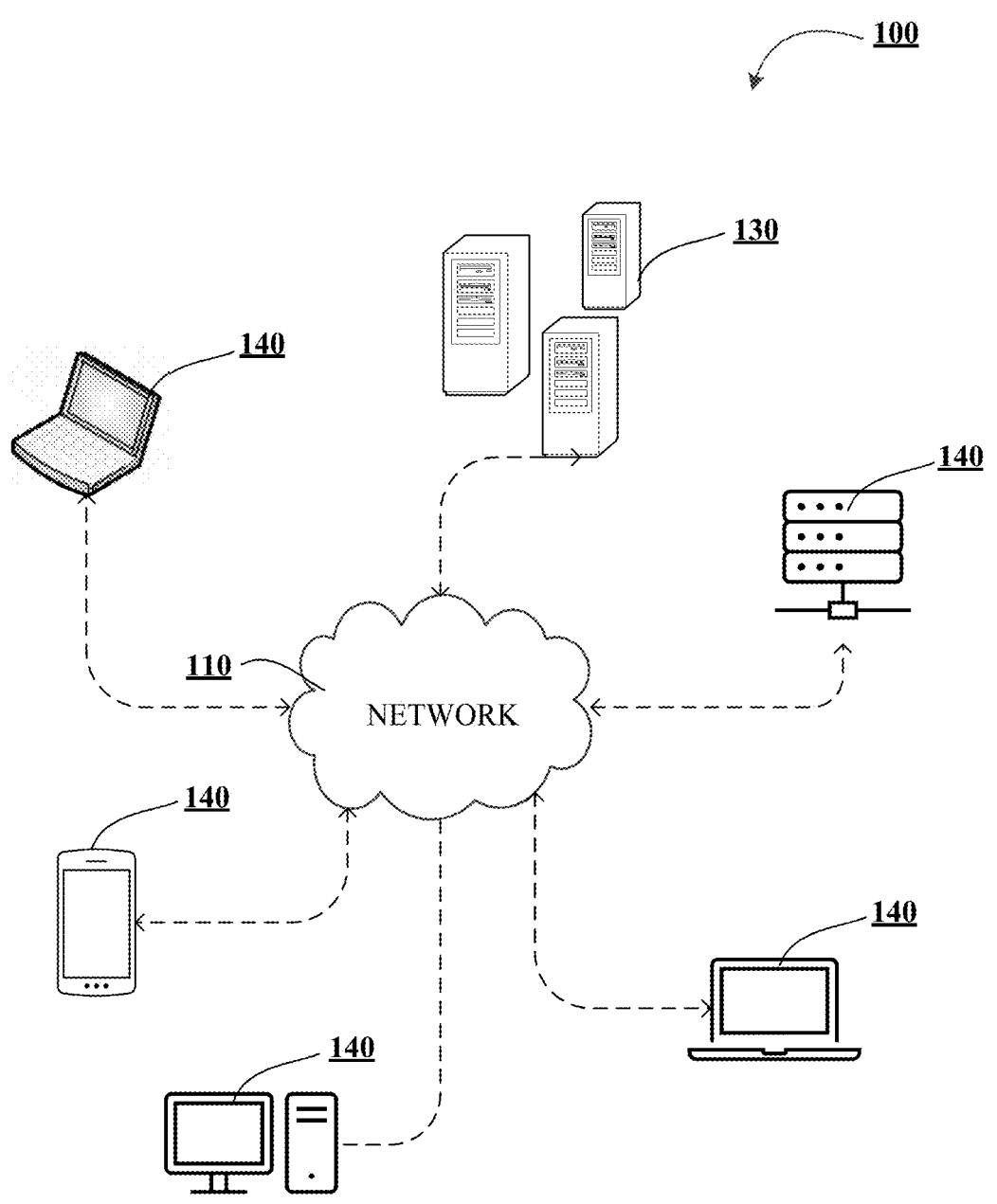
Figure 1B:
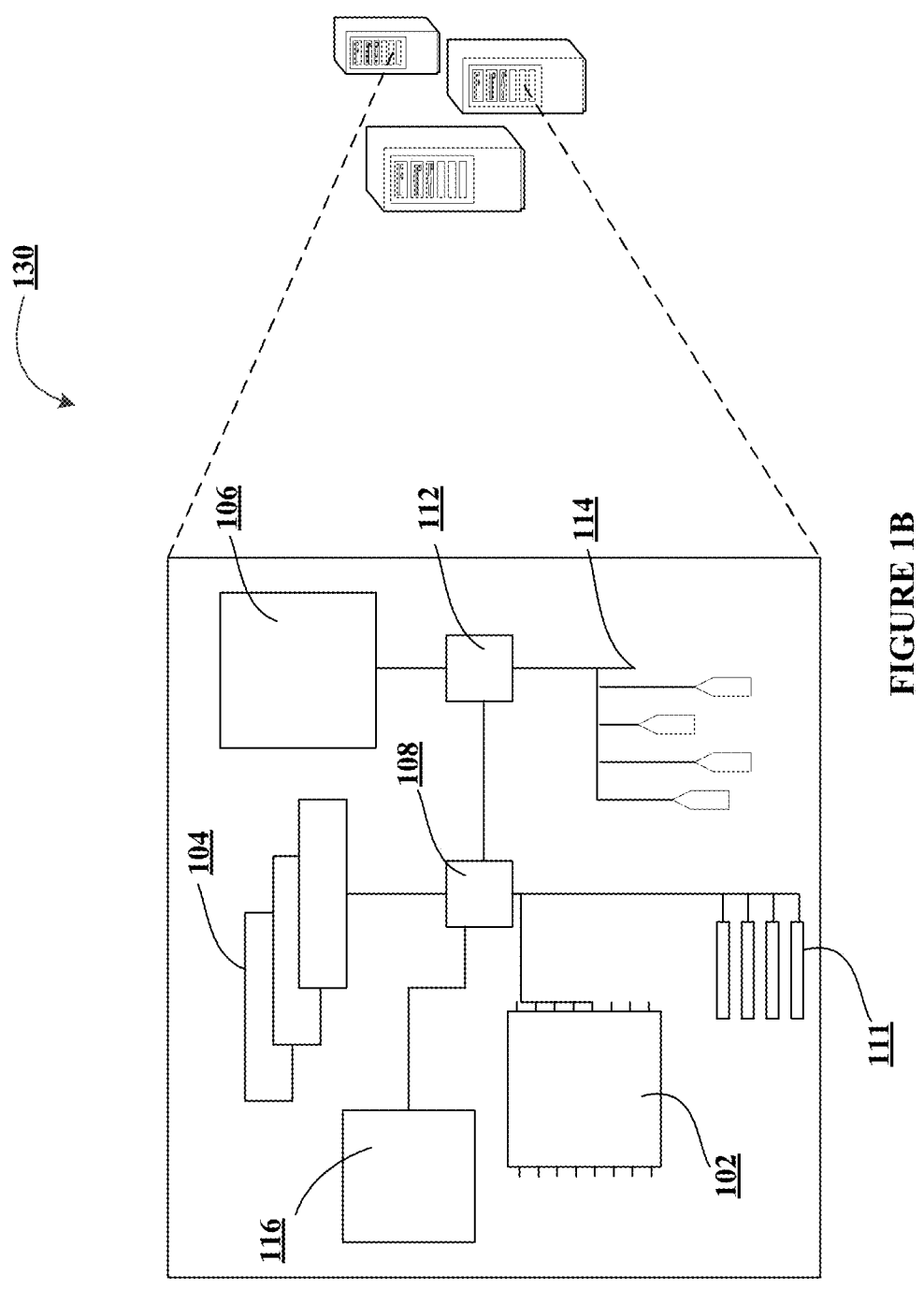
Figure 1C:
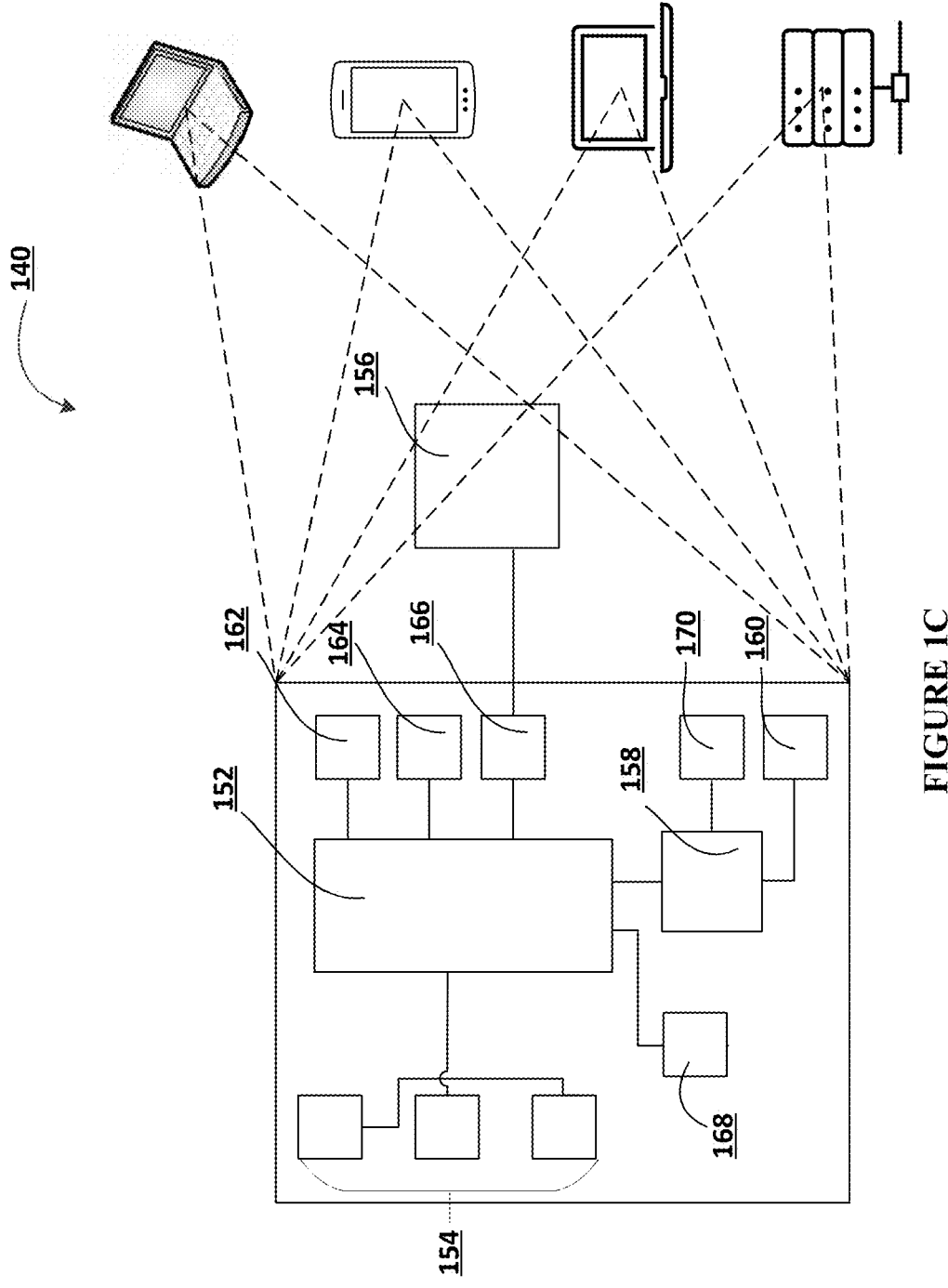
Figure 2:
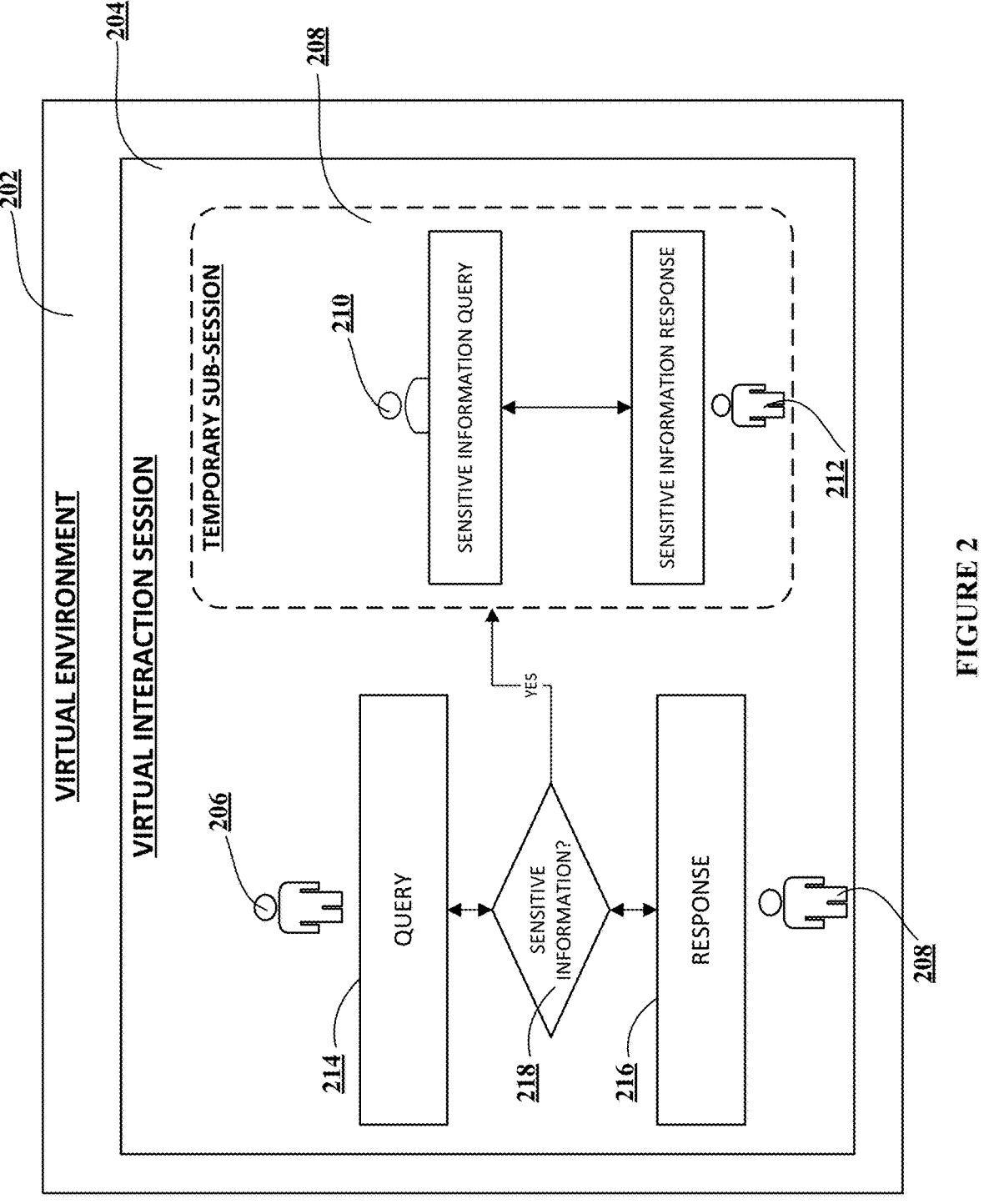

FIGS. 1A-1C illustrates technical components of an exemplary distributed computing environment for secure information transfer in a virtual environment, in accordance with an embodiment of the disclosure;

FIG. 2 illustrates an example virtual interaction between the first user and the second user for secure information transfer in a virtual environment 200, in accordance with an embodiment of the disclosure;

FIG. 3 illustrates a method for secure information transfer in a virtual environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Metaverse, as an evolving paradigm of the next generation Internet, aims to build a fully immersive, and self-sustaining virtual shared space for humans to play, work, and socialize. The metaverse integrates a variety of emerging technologies. The Metaverse is the convergence of, (i) virtually enhanced physical reality, and (ii) physically persistent virtual space. It is a fusion of both, while allowing users to experience it as either. Driven by recent advances in emerging technologies such as extended reality, artificial intelligence, and distributed ledger technology, metaverse is stepping from science fiction to an upcoming reality. However, security and privacy concerns (often inherited from underlying technologies or emerged in the new digital ecology) of metaverse can impede its wide deployment. Therefore, there is a need for a system for secure information transfer in a virtual environment.

Accordingly, the present disclosure, (i) Receives real-time communication from a first user (e.g., customer) during a virtual interaction session with a second user (e.g., employee) in the virtual environment (hosted by the entity such as a financial institution). Both the first user and the second user may be represented by their respective virtual objects (e.g., avatar), (ii) Determines that at least a portion of the real-time communication comprises sensitive information (e.g., PII). The real-time communication between the first user and the second user may be in the form of a query and response. The query and response may be in the form of speech input or gesture-based input, (iii) Initiates a temporary sub-session within the virtual interaction session in response to determining that the real-time communication comprises sensitive information, thereby temporarily pausing the virtual interaction session. The temporary sub-session may be a transient virtual lobby spawned in response to detecting that an exchange of sensitive information is likely to occur within the virtual interactive session between the first user and the second user. The temporary sub-session may include one or more access restrictions to ensure that any sensitive information exchanged within such a session is secured. In case the information (e.g., the sensitive information) is to be exported outside the temporary sub-session, the information is encrypted prior to being removed. Within the temporary sub-session, the second virtual object representing the second user (e.g., employee) may be replaced by an interactive virtual object—an automated virtual object (e.g., robo-avatar) that is linked to the second virtual object. The first virtual object representing the first user (e.g., customer) may be replaced with a duplicate instance of the first virtual object representing the first user, (iv) Records the sensitive information within the temporary sub-session, (v) Generates a second notification indicating that the sensitive information received from the duplicate instance of the first virtual object representing the first user has been recorded and encrypted. The second notification may be pushed to the second virtual object be displayed within the virtual interactive session to the second user. Populate a cloud-based API using the sensitive information, (vi) Terminates the temporary sub-session in response to recording the sensitive information, and (vii) Resumes the virtual interaction session to continue receiving the real-time communication.

FIGS. 1A-1C illustrate technical components of an exemplary distributed computing environment for secure information transfer in a virtual environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as augmented/virtual reality devices, including any sensory-perceptible devices that are required to communicate sensory-perceptible indications (e.g., visual, audible or haptic), personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an example virtual interaction between the first user and the second user for secure information transfer in a virtual environment 200, in accordance with an embodiment of the disclosure. As shown in FIG. 2, the virtual environment 202 may include a virtual interaction session 204. The virtual interaction session 204 may be established to allow an employee of an entity and a customer to interact with one another. Typically, when entities provide a product and/or service to their customer, they may gather all pertinent information about the customer so that they are able to provide their products and/or services to the customer at a high level of efficiency and effect. To this end, large entities employ multiple users to aid in the provision of such products and/or services to the customers. The virtual environment 202 allows for such interactions between employees and customers within particular virtual interaction sessions such as the virtual interaction session 204. As such, the virtual interaction session 204 may include a first virtual object 208 representing customer (e.g., the first user) and a second virtual object 206 representing an employee (e.g., the second user).

As part of their job, depending on the type of product and/or service that the customer wants, the employee may require the customer to provide pertinent information in the form of a query 214 and response 216. During the virtual interaction session 204, the employee may ask the user to provide the pertinent information. In some embodiments, some of the pertinent information may include sensitive information 218. While the sensitive information itself may be necessary for the employee to provide the products and/or services to the user, the employee may not have the requisite authorization to view the information. By detecting that the real-time communication between the employee and the customer during the virtual interaction session includes, or is likely to include sensitive information, a temporary sub-session 208 may be spawned within the virtual interaction session to restrict the employee from being privy to the sensitive information.

When initiating the temporary sub-session, the second virtual object 206 representing the employee may be replaced by an interactive virtual object 210 that is programmed specifically to receive the sensitive information and record the sensitive information. Here, the interactive virtual object 210 may be an automated virtual object (e.g., robo-avatar) that is linked to the second virtual object 206. However, unlike the second virtual object 206, the employee does not have any control over the interactive virtual object 208 and does not have access to the temporary sub-session 204. On the other hand, the customer may have access to the temporary sub-session 208 to be able to provide the sensitive information. While the customer is still subject to the restrictions associated with the temporary sub-session 208, they may still have access to the temporary sub-session until the information provided by the customer as a response to the query satisfies the query. Accordingly, a duplicate instance 212 of the first virtual object 208 representing the customer may be generated in the temporary sub-session 208, thereby allowing the customer to participate in the temporary sub-session.

FIG. 3 illustrates a method for secure information transfer in a virtual environment 300, in accordance with an embodiment of the disclosure. As shown in block 302, the method includes receiving, using a first user input device, real-time communication from a first user during a virtual interaction session with a second user in the virtual environment. First, the method may include receiving, from the first user input device, a request to establish the virtual interaction session with the second user. In response to receiving the request, the method may include establishing the virtual interaction session between the first user and the second user. To this end, the method may include generating a first notification indicating the request from the first user to establish the virtual interaction session with the second user. In response to generating the first notification, the method may include transmitting the first notification to a second user input device associated with the second user, thereby communicating the request from the first user to the second user. In some embodiments, in response to communicating the request from the first user to the second user, the method may include receiving, from the second user input device, a user input from the second user acknowledging the request to establish the virtual interaction session with the first user. In response to receiving the user input from the second user, the method may include establishing the virtual interaction session between the first user and the second user.

In some embodiments, both the first user and the second user may be represented by their respective virtual objects—a customizable graphical representation (e.g., avatar) of the user—in the virtual environment. For example, the first user may be represented in the virtual environment as a first virtual object and the second user may be represented in the virtual environment as a second virtual object. As described herein, the virtual environment may be a self-sustaining virtual shared space for users to play, work, and socialize. To this end, the virtual environment may include a virtual interaction session-a three-dimensional space where users can with one another and with the environment in real-time. The virtual interaction session may be established based on specific needs of the users interacting therewithin. For example, entities such as financial institutions may establish virtual interaction sessions for their customers to provide products and services via the virtual environment without having the customers appear in person to a physical location of the entity. As such, when a customer (e.g., the first user) wishes to interact with an employee (e.g., the second user) of the entity, the customer may request that their interaction be within the virtual environment. To this end, the customer may use a user input device (e.g., the first user input device) to log into a proprietary portal (e.g., application) associated with the entity using their authentication credentials, and upon successful verification of their authentication credentials, the customer may request that a virtual interaction session be established for real-time communication with the employee. In some embodiments, the employee may already be logged into the virtual environment in anticipation of a customer. In such cases, the employee may receive a notification indicating that the customer has requested that a virtual interaction session be established for real-time communication with the employee.

Next, as shown in block 304, the method includes determining that at least a portion of the real-time communication comprises sensitive information. In some embodiments, sensitive information may refer to any information that is protected against unwarranted disclosure for various reasons, for issues pertaining to personal privacy, or for proprietary considerations. For example, sensitive information may include personal information, also known as personally identifiable information (PII), links back to a specific individual and can be pulled together for identification purposes. Examples of a person's personal information include driver's license number, date of birth, Social security number, Phone number, Bank account number, and/or the like.

In some embodiments, the real-time communication between the first user and the second user may be in the form of a query and response. Accordingly, in some embodiments, the method may include receiving, from the second user, a query directed to the first user.

In one aspect, the query and response may be in the form of speech input. Therefore, each query posed by the second user to the first user (or vice versa) may be analyzed, in real-time, using natural language processing (NLP) techniques. NLP is a field of artificial intelligence that deals with how computers can understand, interpret, and generate communication between two persons. NLP uses a combination of machine learning algorithms, natural language processing techniques, and linguistic analysis to process natural language data (e.g., the query). NLP may be used for a variety of tasks such as text classification, sentiment analysis, and machine translation. Accordingly, in response to receiving the query, the method may include parsing, using a natural language processing (NLP) subsystem, the query into one or more components. Parsing allows for analysis and understanding of the structure of a communication (e.g., the query). As such, parsing may involve breaking down the query into its components, such as words, phrases, and clauses, and analyzing the relationships therebetween. In doing so, parsing aids in identifying the meaning of the query and can be used to generate a parse tree that can be used for further analysis. Accordingly, the method may include generating, using the NLP subsystem, a parse tree for the query using the one or more components. A parse tree may be a graphical representation of the syntactic structure of the query that is used in NLP. As such, a parse tree may include nodes and branches that show the relationships between words, phrases, and clauses in the query. By analyzing the parse tree associated with the query, the method may include determining that a response to the query by the first user is likely to comprise the sensitive information. For example, the query posed by the second user may be, "what is your social security number?" By parsing the query and identifying the relationships between the words, phrases, and clauses, the method may include determining that the first user is likely to provide their social security number in response to the second user's query requesting the information.

In another aspect, the query and response may be in the form of gesture-based input. Therefore, each query posed by the second user to the first user (or vice versa) may be analyzed, in real-time, using gesture recognition techniques. In some embodiments, gesture recognition of a user (e.g., the first user) in a virtual environment may accomplished by using motion capture technology as the user interacts with the virtual environment using the user input device. For example, user input devices may include sensors (e.g., visual, audio, haptic, and/or the like) to detect and track the movement of a user's body as the user is interacting with various objects in the virtual environment. This information is then used to interpret the gestures made by the user and generate a response in the virtual environment. For example, a user could make a hand gesture to open a door or interact with an object in the virtual environment. Gesture recognition algorithms may include machine learning (ML) algorithms and/or deep learning (DL) techniques. The ML algorithms capable of gesture recognition may include Viola-Jones target detection, Scale-invariant Feature Transform, histogram of oriented gradient (HOG) algorithm, support vector machines (SVM), and/or the like. The DL techniques capable of gesture recognition may include Region proposals (R-CNN, Fast R-CNN, Faster R-CNN, and cascade R-CNN), Single shot multiBox detector (SSD) such as YOLO and ReneDet, and/or the like.

Next, as shown in block 306, the method includes initiating a temporary sub-session within the virtual interaction session in response to determining that the real-time communication comprises sensitive information, thereby temporarily pausing the virtual interaction session. In some embodiments, the temporary sub-session may be a transient virtual lobby spawned in response to detecting that an exchange of sensitive information is likely to occur within the virtual interactive session between the first user and the second user. In some embodiments, the temporary sub-session may include one or more access restrictions to ensure that any sensitive information exchanged within such a session is secured. For example, the temporary sub-session may be an "air-gapped" virtual interaction sub-session that is spawned to exist only within the virtual interaction session. By air-gapping the temporary sub-session, the method may ensure that any information exchanged within the temporary sub-session remains therewithin. In case the information (e.g., the sensitive information) is to be exported outside the temporary sub-session, the information is encrypted prior to being removed.

As described herein, within the temporary sub-session, the second virtual object representing the employee may be replaced by an interactive virtual object—an automated virtual object (e.g., robo-avatar) that is linked to the second virtual object—that is programmed specifically to receive the sensitive information and record the sensitive information. However, unlike the second virtual object, the second user does not have any control over the interactive virtual object and does not have access to the temporary sub-session. On the other hand, the first may have access to the temporary sub-session to be able to provide the sensitive information. Accordingly, a duplicate instance of the first virtual object representing the first user may be generated in the temporary sub-session, thereby allowing the first user to participate in the temporary sub-session.

Next, as shown in block 308, the method includes recording the sensitive information within the temporary sub-session. In some embodiments, the method may include receiving, within the temporary sub-session, the sensitive information from the duplicate instance of the first virtual object representing the first user. In response to receiving the sensitive information, the method may include encrypting the sensitive information to generate encrypted sensitive information. Once the sensitive information is encrypted, the method may include generating a second notification indicating that the sensitive information received from the duplicate instance of the first virtual object representing the first user has been recorded and encrypted. In response to generating the second notification, the method may include transmitting the second notification to the second user. Here, the second notification may be pushed to the second virtual object be displayed within the virtual interactive session to the second user. In some embodiments, in recording the sensitive information, the method may include involving a cloud-based application programming interface (API), and storing the sensitive information in the cloud-based API.

Next, as shown in block 310, the method includes terminating the temporary sub-session in response to recording the sensitive information. Once the sensitive information has been recorded, the method may include purging the temporary sub-session and returning the first user back to the virtual interaction session. Next, as shown in block 312, the method includes resuming the virtual interaction session to continue receiving the real-time communication. In this way, each time sensitive information is likely to be exchanged between the first user and the second user, a temporary sub-session may be spawned to securely record and encrypt the sensitive information.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for secure information transfer in a virtual environment, the system comprising:
    a processing device;
    a non-transitory storage device containing instructions when executed by the processing device, causes the processing device to perform the steps of:
        receive, from a first user input device, a request from a first user to establish a virtual interaction session with a second user;
        generate a first notification indicating the request from the first user to establish the virtual interaction session with the second user;
        transmit the first notification to a second user input device associated with the second user;
        receive, from the second user input device, a user input from the second user acknowledging the request to establish the virtual interaction session with the first user;
        in response to receiving the user input, establish the virtual interaction session between the first user and the second user based on an interaction purpose between the first user and the second user;
        receive, using the first user input device, real-time communication from the first user during the virtual interaction session with the second user in the virtual environment;
        determine that at least a portion of the real-time communication comprises sensitive information;
        determine that the second user does not have requisite authorization to be privy to the sensitive information;
        initiate a temporary sub-session within the virtual interaction session in response to determining that the real-time communication comprises sensitive information and that the second user does not have the requisite authorization to be privy to the sensitive information, thereby temporarily pausing the virtual interaction session;
        record the sensitive information within the temporary sub-session;
        terminate the temporary sub-session in response to recording the sensitive information; and
        resume the virtual interaction session to continue receiving the real-time communication.

2. The system of claim 1, wherein executing the instructions further causes the processing device to:
    receive, from the second user, a query directed to the first user; and
    determine that the query is associated with the sensitive information.

3. The system of claim 2, wherein executing the instructions further causes the processing device to:
    parse, using a natural language processing (NLP) subsystem, the query into one or more components;
    generate, using the NLP subsystem, a parse tree for the query using the one or more components; and
    determine that the query is associated with the sensitive information based on at least the parse tree.

4. The system of claim 2, wherein executing the instructions to determine that the query is associated with the sensitive information further causes the processing device to:
    determine that a response to the query by the first user is likely to comprise the sensitive information.

5. The system of claim 1, wherein the first user is represented by a first virtual object in the virtual environment and the second user is represented by a second virtual object in the virtual environment.

6. The system of claim 5, wherein executing the instructions to initiate the temporary sub-session within the virtual interaction session further causes the processing device to:
    generate an interactive virtual object to replace the second virtual object in the temporary sub-session, thereby denying the second user access to the temporary sub-session;
    generate a duplicate instance of the first virtual object representing the first user in the temporary sub-session, thereby allowing the first user to participate in the temporary sub-session; and
    record the sensitive information exchanged between the duplicate instance of the first virtual object and the interactive virtual object within the temporary sub-session.

7. The system of claim 6, wherein executing the instructions further causes the processing device to:
    receive, within the temporary sub-session, the sensitive information from the duplicate instance of the first virtual object representing the first user;
    record the sensitive information within the temporary sub-session, wherein recording further comprises encrypting the sensitive information to generate encrypted sensitive information; and
    generate a second notification indicating that the sensitive information received from the duplicate instance of the first virtual object representing the first user has been recorded and encrypted; and
    transmit the second notification to the second user.

8. The system of claim 1, wherein the real-time communication comprises at least speech input and/or gesture-based input.

9. The system of claim 1, wherein executing the instructions to record the sensitive information further causes the processing device to:

invoke a cloud-based application programming interface (API); and store the sensitive information in the cloud-based API.

10. A computer program product for secure information transfer in a virtual environment, the computer program product comprising a non-transitory computer-readable medium comprising code causing an apparatus to:

receive, from a first user input device, a request from a first user to establish a virtual interaction session with a second user;

generate a first notification indicating the request from the first user to establish the virtual interaction session with the second user;

transmit the first notification to a second user input device associated with the second user;

receive, from the second user input device, a user input from the second user acknowledging the request to establish the virtual interaction session with the first user;

in response to receiving the user input, establish the virtual interaction session between the first user and the second user based on an interaction purpose between the first user and the second user;

receive, using the first user input device, real-time communication from the first user during the virtual interaction session with the second user in the virtual environment;

determine that at least a portion of the real-time communication comprises sensitive information;

determine that the second user does not have requisite authorization to be privy to the sensitive information;

initiate a temporary sub-session within the virtual interaction session in response to determining that the real-time communication comprises sensitive information and that the second user does not have the requisite authorization to be privy to the sensitive information, thereby temporarily pausing the virtual interaction session;

record the sensitive information within the temporary sub-session;

terminate the temporary sub-session in response to recording the sensitive information; and resume the virtual interaction session to continue receiving the real-time communication.

11. The computer program product of claim 10, wherein the code is further configured to cause the apparatus to:

receive, from the second user, a query directed to the first user; and determine that the query is associated with the sensitive information.

12. The computer program product of claim 11, wherein the code is further configured to cause the apparatus to:

parse, using a natural language processing (NLP) subsystem, the query into one or more components;

generate, using the NLP subsystem, a parse tree for the query using the one or more components; and determine that the query is associated with the sensitive information based on at least the parse tree.

13. The computer program product of claim 11, wherein, in determining that the query is associated with the sensitive information, the code is further configured to cause the apparatus to:

determine that a response to the query by the first user is likely to comprise the sensitive information.

14. The computer program product of claim 10, wherein the first user is represented by a first virtual object in the virtual environment and the second user is represented by a second virtual object in the virtual environment.

15. The computer program product of claim 14, wherein, in initiating the temporary sub-session within the virtual interaction session, the code is further configured to cause the apparatus to:

generate an interactive virtual object to replace the second virtual object in the temporary sub-session, thereby denying the second user access to the temporary sub-session;

generate a duplicate instance of the first virtual object representing the first user in the temporary sub-session, thereby allowing the first user to participate in the temporary sub-session; and record the sensitive information exchanged between the duplicate instance of the first virtual object and the interactive virtual object within the temporary sub-session.

16. A method for secure information transfer in a virtual environment, the method comprising:

receiving, from a first user input device, a request from a first user to establish a virtual interaction session with a second user;

generating a first notification indicating the request from the first user to establish the virtual interaction session with the second user;

transmitting the first notification to a second user input device associated with the second user;

receiving, from the second user input device, a user input from the second user acknowledging the request to establish the virtual interaction session with the first user;

in response to receiving the user input, establishing the virtual interaction session between the first user and the second user based on an interaction purpose between the first user and the second user;

receiving, using the first user input device, real-time communication from the first user during the virtual interaction session with the second user in the virtual environment;

determining that at least a portion of the real-time communication comprises sensitive information;

determining that the second user does not have requisite authorization to be privy to the sensitive information;

initiating a temporary sub-session within the virtual interaction session in response to determining that the real-time communication comprises sensitive information and that the second user does not have the requisite authorization to be privy to the sensitive information, thereby temporarily pausing the virtual interaction session;

recording the sensitive information within the temporary sub-session;

terminating the temporary sub-session in response to recording the sensitive information; and resuming the virtual interaction session to continue receiving the real-time communication.

\* \* \* \* \*